United States Patent
Ekanadham et al.

(10) Patent No.: US 7,519,777 B1
(45) Date of Patent: Apr. 14, 2009

(54) METHODS, SYSTEMS AND COMPUTER PROGRAM PRODUCTS FOR CONCOMITANT PAIR PREFETCHING

(75) Inventors: Kattamuri Ekanadham, Mohegan Lake, NY (US); Il Park, Fishkill, NY (US); Pratap C. Pattnaik, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/136,808

(22) Filed: Jun. 11, 2008

(51) Int. Cl.
*G06F 12/00* (2006.01)
*G06F 13/00* (2006.01)
*G06F 13/28* (2006.01)
*G06F 9/30* (2006.01)
*G06F 9/40* (2006.01)
*G06F 15/00* (2006.01)
*G06F 7/38* (2006.01)
*G06F 9/00* (2006.01)
*G06F 9/44* (2006.01)

(52) U.S. Cl. .................. 711/137; 711/204; 711/213; 712/207; 712/233; 712/234; 712/235; 712/236; 712/237; 712/238; 712/239; 712/240

(58) Field of Classification Search ............. 711/137, 711/204, 213; 712/207, 233–240
See application file for complete search history.

(56) References Cited

U.S. PATENT DOCUMENTS

| 5,809,566 | A | 9/1998 | Charney et al. | |
|---|---|---|---|---|
| 6,760,817 | B2 | 7/2004 | Arimilli et al. | |
| 6,976,147 | B1 | 12/2005 | Isaac et al. | |
| 2002/0078061 | A1* | 6/2002 | Wong et al. | 707/101 |
| 2005/0010740 | A1* | 1/2005 | Wong et al. | 711/213 |
| 2005/0268046 | A1* | 12/2005 | Heil | 711/137 |
| 2006/0047915 | A1 | 3/2006 | Janik et al. | |

* cited by examiner

*Primary Examiner*—Sanjiv Shah
*Assistant Examiner*—Yaima Campos
(74) *Attorney, Agent, or Firm*—Cantor Colburn LLP; Brian Verminski

(57) ABSTRACT

Methods, systems and computer program products for concomitant pair per-fetching. Exemplary embodiments include a method for concomitant pair prefetching, the method including detecting a stride pattern, detecting an indirect access pattern to define an access window, prefetching candidates within the defined access window, wherein the prefetching comprises obtaining prefetch addresses from a history table, updating a miss stream window, selecting a candidate of a concomitant pair from the miss stream window, producing an index from the candidate pair, accessing an aging filter, updating the history table and selecting another concomitant pair candidate from the miss stream window.

1 Claim, 5 Drawing Sheets ns, i=0,n. Let @X and ΔX can respectively denote the

METHODS, SYSTEMS AND COMPUTER PROGRAM PRODUCTS FOR CONCOMITANT PAIR PREFETCHING

TRADEMARKS

IBM® is a registered trademark of International Business Machines Corporation, Armonk, N.Y, U.S.A. Other names used herein may be registered trademarks, trademarks or product names of International Business Machines Corporation or other companies.

BACKGROUND OF THE INVENTION

1. Field of the Invention

This invention relates to prefetching data, and particularly to methods, systems and computer program products for concomitant pair prefetching.

2. Description of Background

Prefetching is an effective way of hiding memory latency by anticipating future cache misses and bringing them earlier than being requested by the pipeline. Each prefetch algorithm tries to aim a specific reference stream pattern. The most popular reference stream pattern for prefetching is stride pattern, which often shows up in scientific applications. However, non-scientific applications often lack of stride pattern among reference stream and give little chance to improve performance toward such prefetching logics. Especially, recent commercial applications show little of stride patterns in memory reference streams and so give little hope of improving performance when stride-based prefetching logic is used alone.

Meanwhile, correlation-based prefetching algorithms show higher chance of detecting concomitant patterns from the recent commercial applications. Previous academic papers and patents regarding correlation-based prefetching have been focused on how to build pairs of leaders and followers and how to increase the coverage of prefetching. Currently, the tremendous increase of inaccurate prefetching requests is the biggest enemy of these correlation based prefetching approaches. Current solutions include adding some confirmation logic as a feedback mechanism in the effort of reducing inaccurate prefetching request and so wasting bus bandwidth.

However, the key of success in implementing a correlation-based prefetching logic for commercial processors is how to avoid employing gigantic tables to hold all possible pairs and how to minimize inaccurate prefetch requests. Depending on the location of the prefetch logic, timing for state updates and prefetch address look up can also be critical to the success of implementing a correlation-based prefetch logic.

In scientific computations involving sparse matrices, it is common to compute the indices of desired elements of an array and store them into another array and access them indirectly as illustrated by the following pseudo-code: access $A[B[i]]$, $i=0,n$. Let $@X$ and $\Delta X$ can respectively denote the starting address and element size of any vector X and $M[y]$ can denote the contents of memory location at address y. Then the address sequence generated by the above program segment is given by $\{@B+i*\Delta B, @A+M[@B+i*\Delta B]*\Delta A\}$, $i=0,n$. It would be desirable to generate intelligent prefetching of these accesses. Current techniques detect constant strided-accesses of the type $\{@B+i*\Delta B\}$, $i=0,n$, where .B is a constant, or chained accesses of the type $\{@Ri, @Ri+\Delta\}$, where $@R(i+1)=M[@Ri+\Delta]$, $i=0,n$. Here, a record is accessed at @Ri, then a link field in it at offset Δ is accessed and then the next record, which is pointed by the contents of the link $M[@Ri+\Delta]$, is accessed. A third category of concomitant accesses, $\{@A, @B\}$, where the pair of addresses are unrelated, but co-occur, so that whenever the first is accessed, the second can be pre-fetched. Currently there is no way to fetch the indirect array accesses.

SUMMARY OF THE INVENTION

Exemplary embodiments include a method for concomitant pair prefetching by collecting cache miss addresses to define an access window, wherein the access window is called a Miss Stream Window (MSW), obtaining a prefetch address from a history table, in response to a new cache miss address, wherein the miss address is stored as an indexed entry in the history table and is considered as a candidate for the prefetch address, updating a miss stream window, wherein an oldest entry in the miss stream window is evicted in response to the new cache miss address and wherein a header pointer points to a new oldest miss address and a tail pointer points to the new cache miss address, selecting a candidate of a concomitant pair from the miss stream window, wherein the new miss address is a candidate for a leader miss address, and wherein remaining miss addresses in the miss stream window are candidates for follower miss addresses, for each remaining miss addresses generating a pair address from the new miss address and a miss address adjacent the leader miss address, wherein the new miss address and the miss address adjacent the lead miss address is a concomitant pair, feeding the pair address into a hash function to produce an index to access an aging filter, accessing the aging filter to determine if the concomitant pair has previously occurred and in response to the concomitant pair having previously occurred, recording the concomitant pair in the history table and replacing the follower address with a next follower address from the remaining miss addresses.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides a prefetching algorithm that aims concomitant patterns. This prefetching engine is an evolution of what has been called correlation-based prefetching in the previous literatures. Markov prefetching is one of the most famous algorithms in this kind. Although stride-based prefetch engines have been more popular in the industry due to their compact designs and appealing benefits for regular memory accesses available in scientific applications, recent commercial applications often lack of stride patterns due to their irregular memory access styles. Correlation-based prefetching algorithms show higher chance of detecting concomitant patterns from the recent commercial applications. However, the key of success in implementing a correlation-based prefetching logic is how to avoid employing gigantic tables to hold all possible pairs and how to minimize inaccurate prefetch requests. A small miss stream window is used as a window of candidacy of concomitant patterns. An aging filter is used as a membership engine. A history table keeps track of important records of past concomitant patterns. By properly arranging and controlling these architectural components together, we achieve the goal that accessing and updating all three logics are not in the critical path, and finding prefetch addresses involves simple table access with the history table.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Exemplary embodiments include methods, systems and computer programs that aim concomitant patterns. The prefetching engine described herein is an extension of what has been called correlation-based prefetching. Although stride-based prefetch engines have been more popular in due to their compact designs and appealing benefits for regular memory accesses available in scientific applications, recent commercial applications often lack of stride patterns due to their irregular memory access styles. Correlation-based prefetching algorithms show a higher chance of detecting concomitant patterns from the recent commercial applications. However, the key of success in implementing a correlation-based prefetching logic is how to avoid employing gigantic tables to hold all possible pairs and how to minimize inaccurate prefetch requests.

In exemplary embodiments, the methods, systems and computer program products described herein provide a small miss stream window as a window of candidacy of concomitant patterns. An aging filter is implemented as a membership engine. Finally, a history table is implemented to keep track of important records of past concomitant patterns. By properly arranging and controlling these architectural components together, the goal that accessing and updating all three logics are not in the critical path, and finding prefetch addresses involves simple table access with the history table are achieved.

In exemplary embodiments, the methods systems and computer products described herein provide a prefetch engine that tracks both address and corresponding data sequences.

Figure 5:
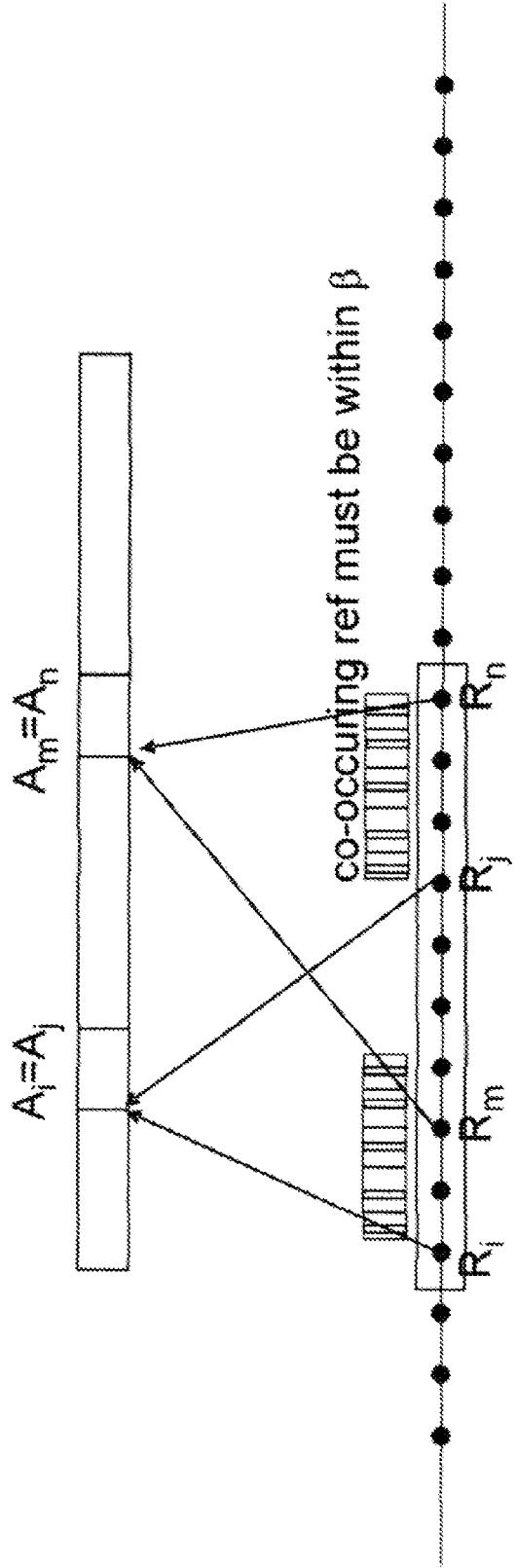
FIG. 5 illustrates an instance of concomitant pair reference with mathematical constraints applied to the reference pattern.

Consider the following sequences, which is used in FIG. 5:

(1) $<R_i, A_i> <R_j, A_j>, <R_m, A_m><R_n, A_n>$, where $R_k$ is the reference number for the k-th cache miss reference and $A_k$ is the address of the k-th cache miss reference.

(2) $A_i = A_j, A_m = A_n$.

(3) $R_j - R_i \leq \alpha, R_m - R_i \leq \beta, R_n - R_j \leq \beta$.

Figure 1:
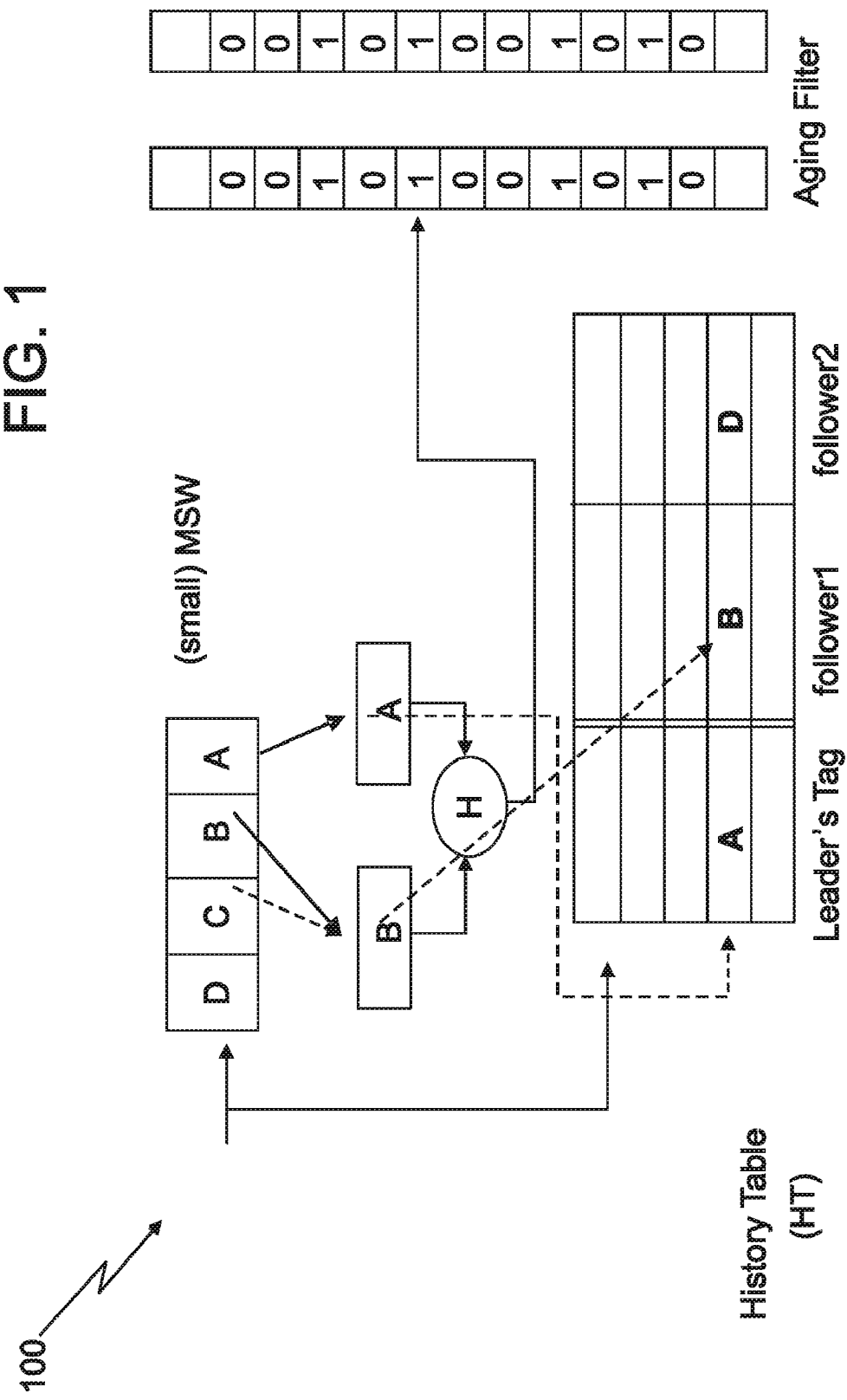
FIG. 1 illustrates a diagram of the concomitant pair prefetching logic in accordance with exemplary embodiments.

For a certain constant $\alpha$ and $\beta$, when (2) and (3) are satisfied, the reference sequence (1) is considered a concomitant pattern. When a cache miss $A_i$ happens, address $A_m$ is going to be prefetched. And, when a cache miss $A_j$ happens, address $A_n$ is going to be prefetched. In the exemplary embodiments shown in this disclosure, the value of $\beta$ is strongly coupled with the size of MSW in FIG. 1, and the value of $\alpha$ is coupled with the size of History Table in FIG. 1.

In exemplary embodiments, the prefetch engine can be equipped with a few constant element sizes and a small window. In addition, the prefetch engine can explore all the element sizes as weights and compare with all accesses within the small window (after each data) and lock on the access that gives a constant difference. Usually the element sizes are powers of 2, so that a simple shift accomplishes the task of multiplication. In exemplary embodiments, the prefetch engine can be implemented with a compiler to communicate with the prefetch engine (via a special instruction) informing the potential candidates of concomitant pattern references. As such, the prefetch engine becomes more effective as it does not have to learn the pattern by itself Turning now to the drawings in greater detail, it will be seen that in FIG. 1 there is a diagram of the concomitant pair prefetching logic 100 in accordance with exemplary embodiments. The prefetching logic consists of three architectural components: (1) Miss Stream Window (MSW) with a hash logic, (2) Aging Filter, and (3) History Table. In exemplary embodiments, the MSW is a First-In-First-Out (FIFO) queue and provides a small time window of considering the candidacy of concomitant pairing for a pair of reference addresses that cause misses in the targeted cache and occur within a certain time distance that is limited by the size of MSW. The oldest miss address sits in the head and youngest miss address sits in the tail. The oldest miss address is considered as a leader in a given moment, and other miss addresses are considered as followers. A hash function is used to produce an index from a pair of miss addresses—the leader and one follower. This index is used to index the Aging Filter. In exemplary embodiments, the Aging Filter includes a certain number of bit vectors. Each entry represents the previous occurrence of the relevant pair of miss addresses. If any one of bit vector shows non-zero bit for a certain entry, it means that the relevant pair happened before. If all of bit vectors show zeros for a certain entry, it means that the relevant pair has not happened for a certain time period. In exemplary embodiments, the History table records the past but important pairs of concomitant patterns. Each entry in the history table holds the records of concomitant pairs that share a leader miss address. Accordingly, the table is expected to index with a follower miss address. The first field in each entry holds the tag of the leader miss address. The remaining fields in the entry holds the follower miss addresses that are going to be used as prefetching addresses when the history table is indexed with a follower miss address. In the event of table lookup, a new miss address accesses the history table acting as a follower miss address. If the tag comparison fails, no prefetching will happen. If the tag comparison succeeds, the followers stored in the indexed entry will be used as prefetching addresses. In the event of table update, the whole entry is replaced with a new set of concomitant paring information when a leader miss address fails the tag comparison with the stored tag in the indexed entry. When a leader miss address succeeds the tag comparison with the stored tag in the indexed entry, a new follower replaces one of the follower addresses stored in the indexed entry. Least Recently Used (LRU) or Round-Robin can be implemented for the replacement policy.

Figure 2:
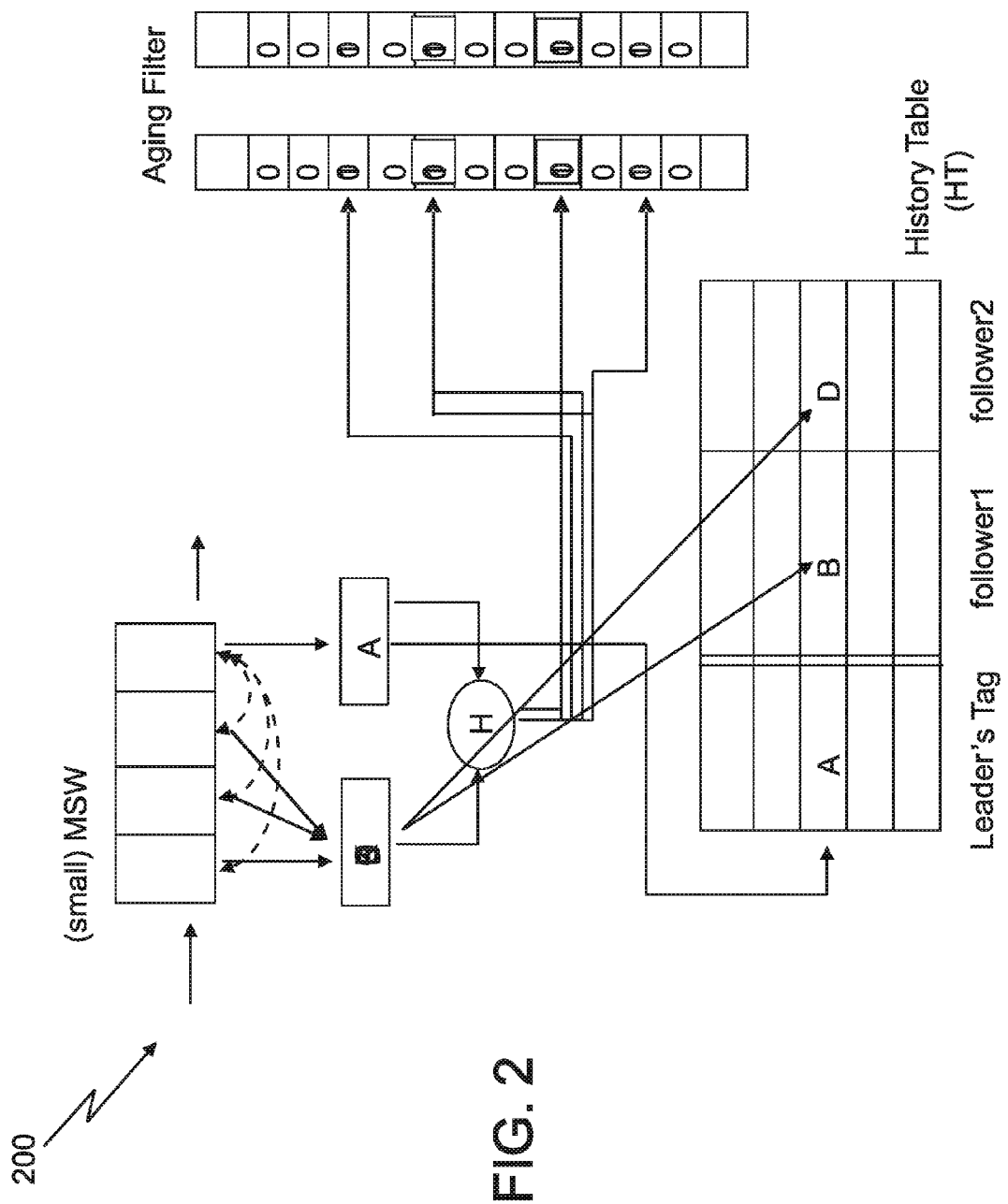
FIG. 2 illustrates a diagram of logic for updating tables in accordance with exemplary embodiments.
Figure 3:
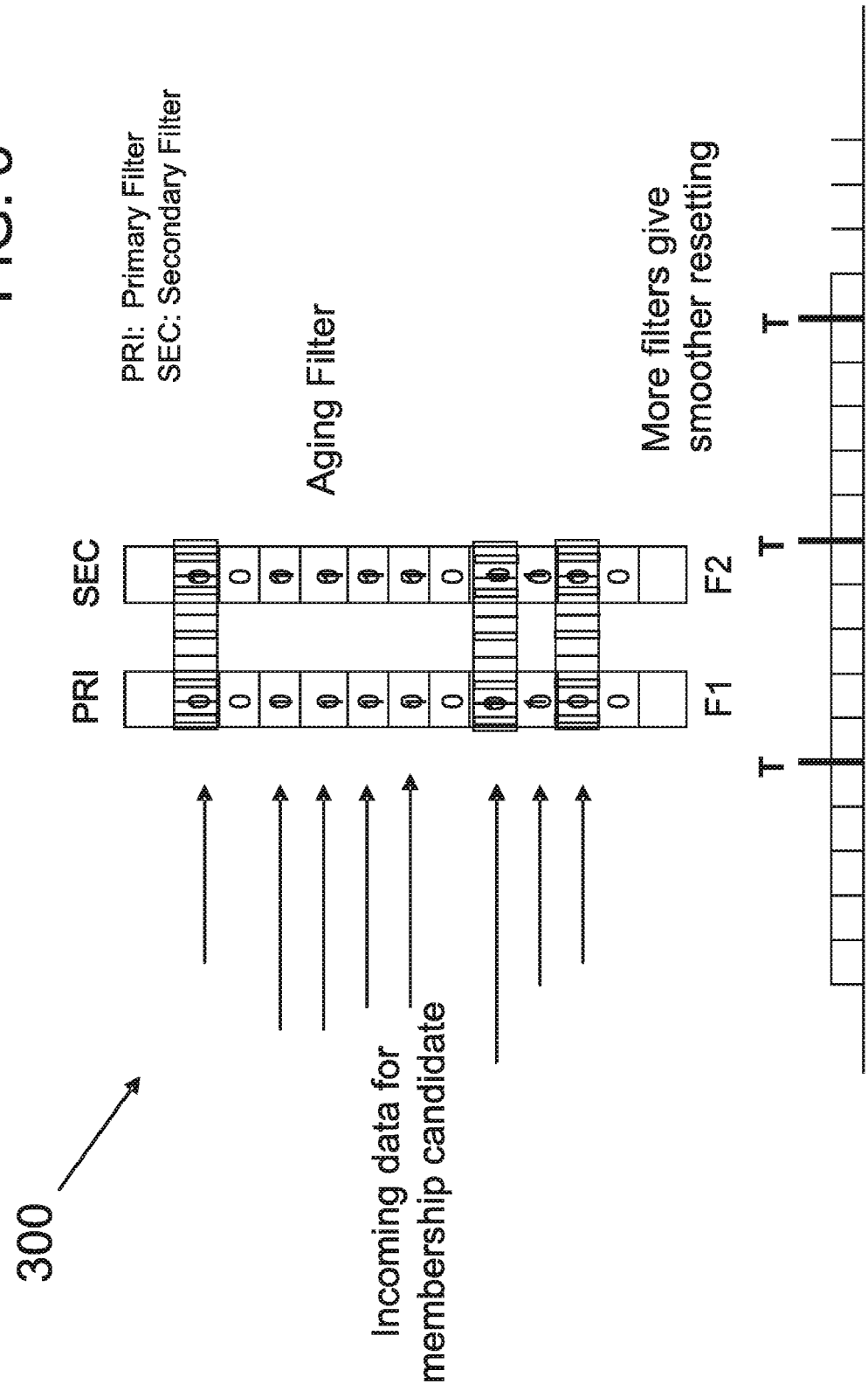
FIG. 3 illustrates a diagram of logic for aging stale filter entries in accordance with exemplary embodiments.

FIG. 2 illustrates a diagram of logic 200 for updating tables in accordance with exemplary embodiments. FIG. 3 illustrates a diagram of logic 300 for aging stale filter entries in accordance with exemplary embodiments. In exemplary embodiments, resetting is implemented for aging out the stale information in the filter. Furthermore, the logic 300 switches the primary and secondary a the end of a T period.

The following discussion describes how to recognize concomitant pairs among reference streams and use the information for prefetching by illustrating one possible implementation example. In exemplary embodiments, prefetch addresses are obtained form the history table at step 1. When a new cache miss occurs, the new miss address is used to index History Table. If tag-comparison fails, there is no opportunity for prefetching. If tag-comparison succeeds, the miss addresses stored in the indexed entry as followers are considered as candidates for prefetch addresses. The MSW is then updated at step 2. As described above, the MSW is a FIFO queue to hold a recent set of cache miss addresses. When a new cache miss occurs, the oldest entry in MSW is evicted and leaves the space for the new miss address. Header pointer is updated so that it points to the new oldest miss address in MSW. Tail points to the new miss address. A candidate of the concomitant pair is then chosen from the MSW at step 3. The miss address pointed by the header pointer is considered as a candidate for a leader miss address. The remaining miss addresses in MSW are considered as candidates for follower miss addresses. The miss address sitting right next to the leader miss address in MSW is picked as a first follower to be considered. An index from the candidate pair is then produced at step 4. Two addresses from the candidate miss address pair are fed into the hash function to produce an index to access Aging Filter. The aging filter is then accessed at step 5. If all bit vectors have zeros for the indexed entry in Aging Filter, it means that the concomitant pair used to produce this index has not occurred before. Then, all bit vectors set the value of the indexed entry to one. At this point, another concomitant pair is selected from the MSW at step 7 described below. If any of bit vectors has non-zero for the indexed entry, it means that the concomitant pair used to produce this index occurred before. Now, it is time to record this pair at History Table. The history table is then updated at step 6. The leader miss address from the current concomitant pair is used to index History Table. If tag-comparison succeeds, the follower miss address from the current concomitant pair replaces one of the follower addresses stored in the indexed entry. If tag-comparison fails, the entire entry is reset to zero and the tag is updated according to the new leader miss address from the current concomitant pair. As described above, another concomitant pair candidate is selected from the MSW at step 7. Choose another miss address sitting next to the miss address previously chosen as a follower address. This new miss address acts as a new follower address to constitute a concomitant pair candidate with the leader miss address. Step 4 is then repeated. In exemplary embodiments, the steps are repeated until all remaining miss addresses are considered as followers for constituting concomitant pairs.

Figure 4:
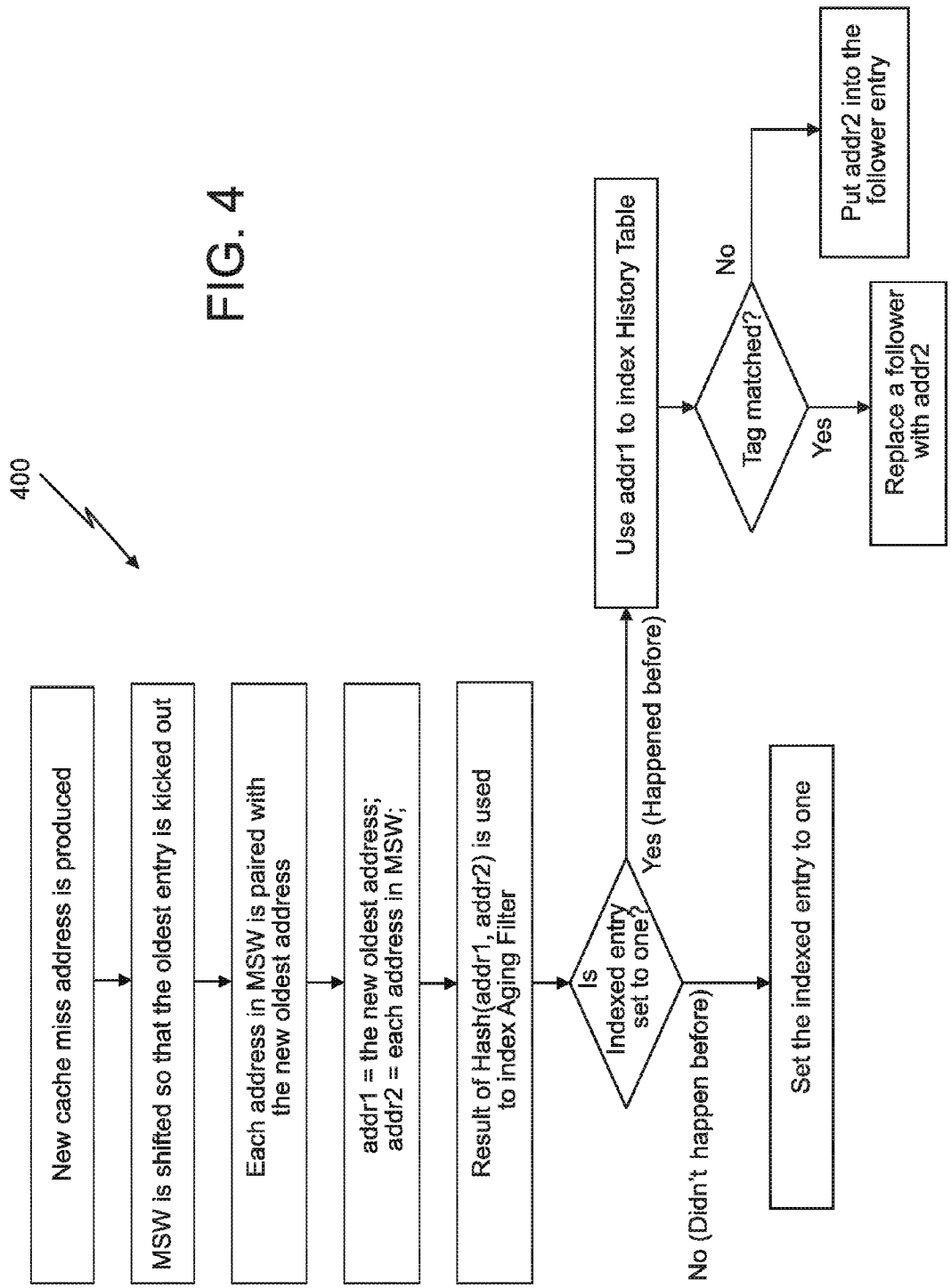
FIG. 4 illustrates a flow chart for a method for accessing and updating MSW, Aging Filter, and History Table in order to capture concomitant pairs within a defined access window.

FIG. 4 illustrates a flow chart for a method for accessing and updating MSW, Aging Filter, and History Table in order to capture concomitant pairs within a defined access window. FIG. 5 illustrates an instance of concomitant pairs occurring among memory references. Theoretically, there is no need to have a constraint of $\alpha$ and $\beta$ to find concomitant pairs among memory references. However, in a real implementation of such a hardware, there are limited amount of states to record and keep track of. Otherwise, the size of the hardware to support data keeping and recording will grow exponentially and become too expensive to implement.

FIG. 1 to FIG. 4 illustrate exemplary implementations of the methods, systems and computer program products described herein, and cache misses as input streams are examined. In FIG. 5, upper boundaries $\alpha$ and $\beta$ represent the distance between two pairs of concomitant pairs and the distance between two references within a concomitant pair. The input stream can be extended to any memory references coming into the target cache. For that case, it is detrimental to apply not only the upper boundary but also the lower boundary to the distances between candidate references. Therefore, the constraints for reference distance should be changed to $\gamma \leq R_j - R_i \leq \alpha, \eta \leq R_m - R_i \leq \beta, \eta \leq R_i - R_j \leq \beta$, where $\gamma$, $\eta$, $\beta$, and $\alpha$ are constants.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for concomitant pair prefetching, the method consisting of:
    collecting cache miss addresses to define an access window, wherein the access window is called a Miss Stream Window (MSW);
    obtaining a prefetch address from a history table, in response to a new cache miss address, wherein the miss address is stored as an indexed entry in the history table and is considered as a candidate for the prefetch address;
    updating a miss stream window, wherein an oldest entry in the miss stream window is evicted in response to the new cache miss address and wherein a header pointer points to a new oldest miss address and a tail pointer points to the new cache miss address;
    selecting a candidate of a concomitant pair from the miss stream window, wherein the new oldest miss address is a candidate for a leader miss address, and wherein remaining miss addresses in the miss stream window are candidates for follower miss addresses;
    for each remaining miss addresses:
    generating a pair address from the leader miss address and a miss address adjacent the leader miss address, wherein the leader miss address and the miss address adjacent the lead miss address is a concomitant pair;

feeding the pair address into a hash function to produce an index to access an aging filter; accessing the aging filter to determine if the concomitant pair has previously occurred; and in response to the concomitant pair having previously occurred, recording the concomitant pair in the history table and replacing the follower address with a next follower address from the remaining miss addresses.

* * * * *